United States Patent
Kadowaki et al.

(10) Patent No.: US 6,735,488 B2
(45) Date of Patent: May 11, 2004

(54) PRODUCTION PROCESS STANDARDIZATION SYSTEM OF SEMICONDUCTOR DEVICE AND METHOD OF SAME AND STORAGE MEDIUM STORING THAT METHOD

(75) Inventors: Tomohiko Kadowaki, Kanagawa (JP); Tadahiko Nakamura, Kanagawa (JP)

(73) Assignee: Semiconductor Technology Academic Research Center (JP)

( * ) Notice: Subject to any disclaimer, the term of this patent is extended or adjusted under 35 U.S.C. 154(b) by 99 days.

(21) Appl. No.: 09/948,547

(22) Filed: Sep. 10, 2001

(65) Prior Publication Data

US 2002/0032493 A1 Mar. 14, 2002

(30) Foreign Application Priority Data

Sep. 11, 2000 (JP) .................... P2000-274358

(51) Int. Cl.$^7$ .............................. G06F 19/00
(52) U.S. Cl. .......................... 700/93; 700/121
(58) Field of Search .............. 700/97, 103, 109–110, 700/121

(56) References Cited

U.S. PATENT DOCUMENTS 5,572,430 A * 11/1996 Akasaka et al. ............ 700/95
6,106,568 A * 8/2000 Beausang et al. ............ 716/18
6,128,403 A * 10/2000 Ozaki ........................ 382/145
6,446,021 B1 * 9/2002 Schaeffer .................... 702/118
6,470,489 B1 * 10/2002 Chang et al. ................ 716/21
6,493,082 B2 * 12/2002 Nara et al. .................. 356/394

FOREIGN PATENT DOCUMENTS

| JP | 62-113074 | 5/1987 |
| JP | 64-084657 | 3/1989 |

* cited by examiner

Primary Examiner—Leo Picard
Assistant Examiner—Zoila Cabrera
(74) Attorney, Agent, or Firm—Rader, Fishman & Grauer PLLC

(57) ABSTRACT

A production process standardization system of a semiconductor device for standardizing design rules among companies and smoothening requests for semiconductor production and distribution and re-use of design assets among companies wherein standardized design rules of a semiconductor are commonly managed by a common database management server and wherein a plurality of companies acquire the standardized design rules via the Internet and design the semiconductor device according to the commonly managed design rules, a method of the same, and a storage medium storing that method.

15 Claims, 11 Drawing Sheets

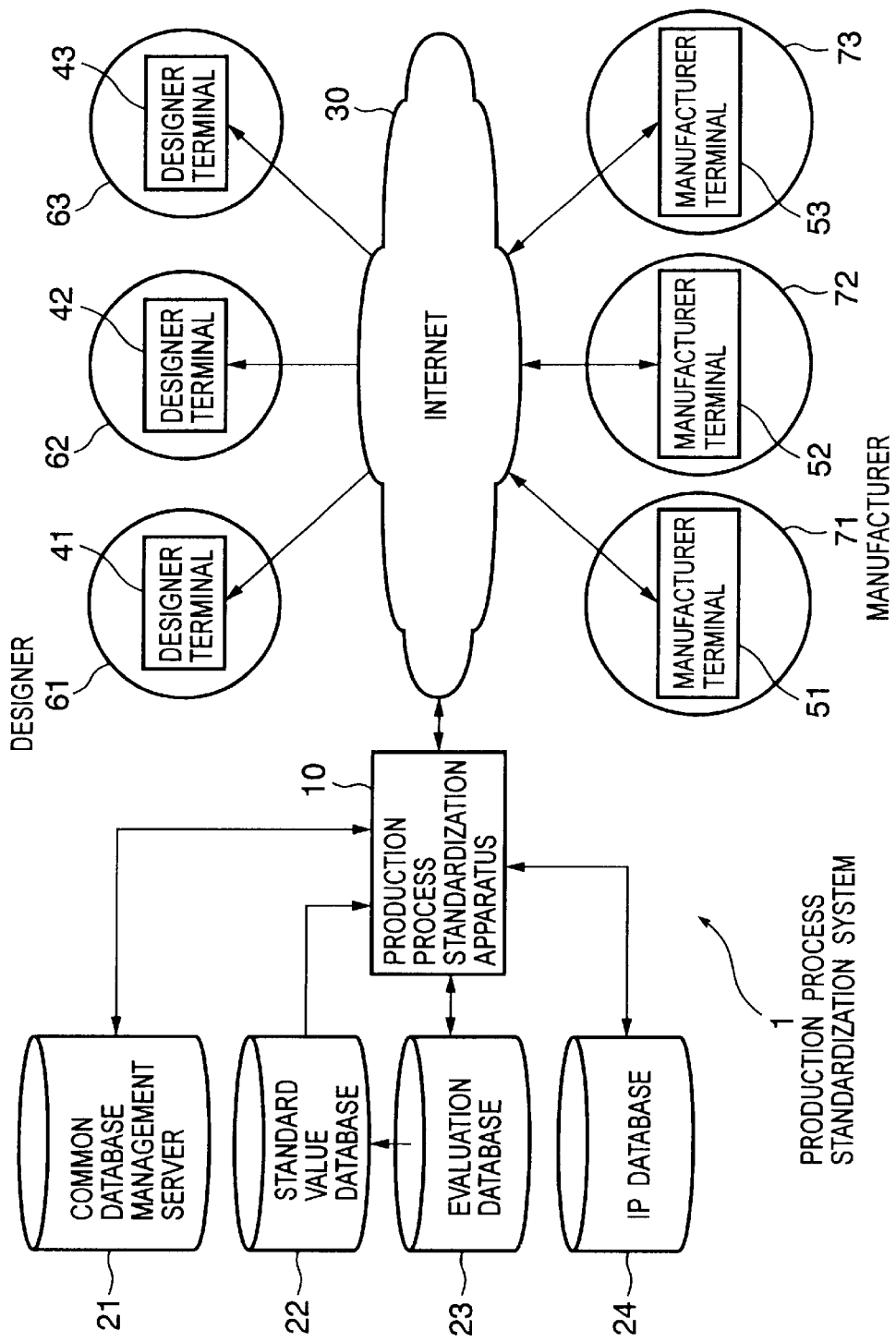

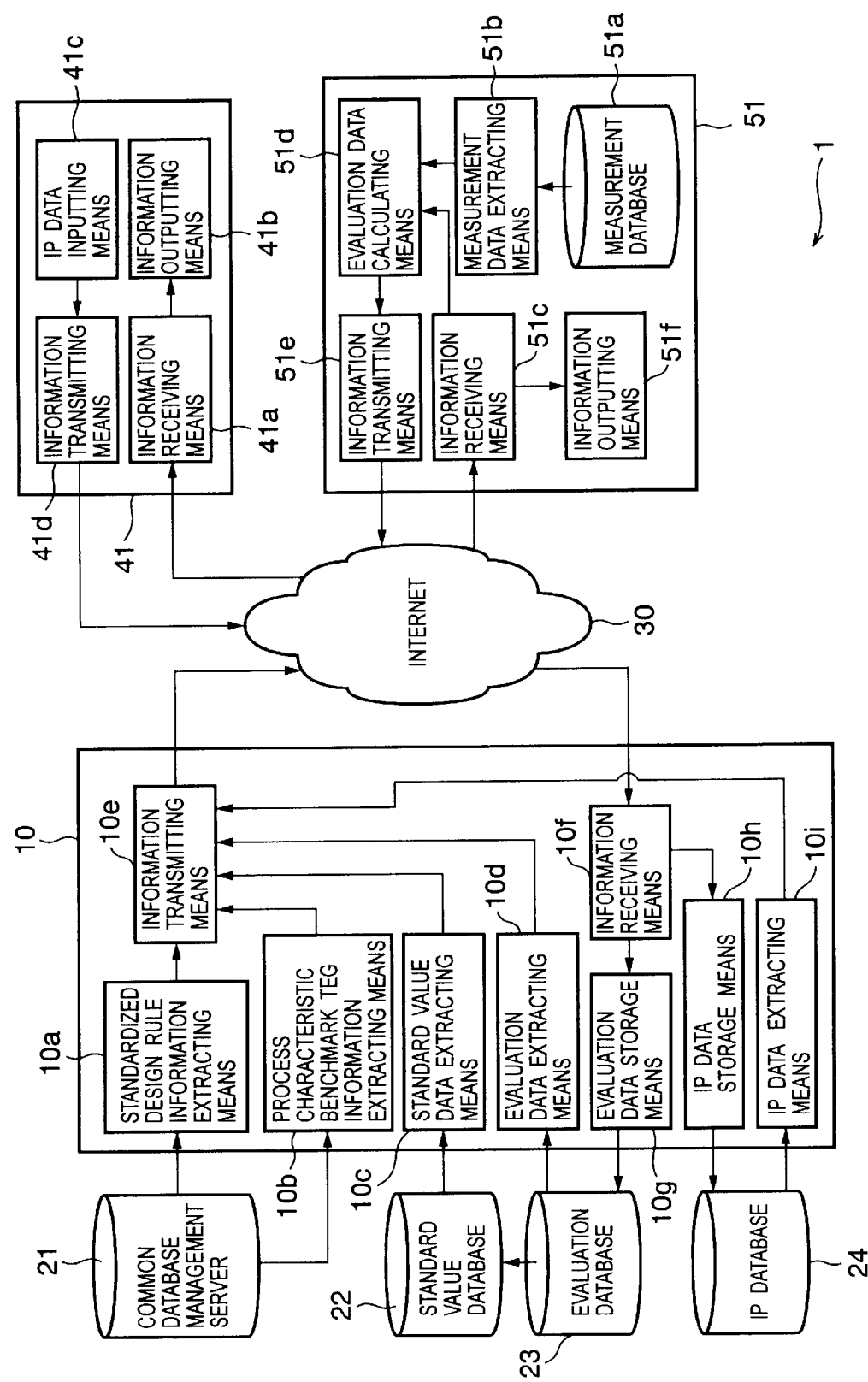

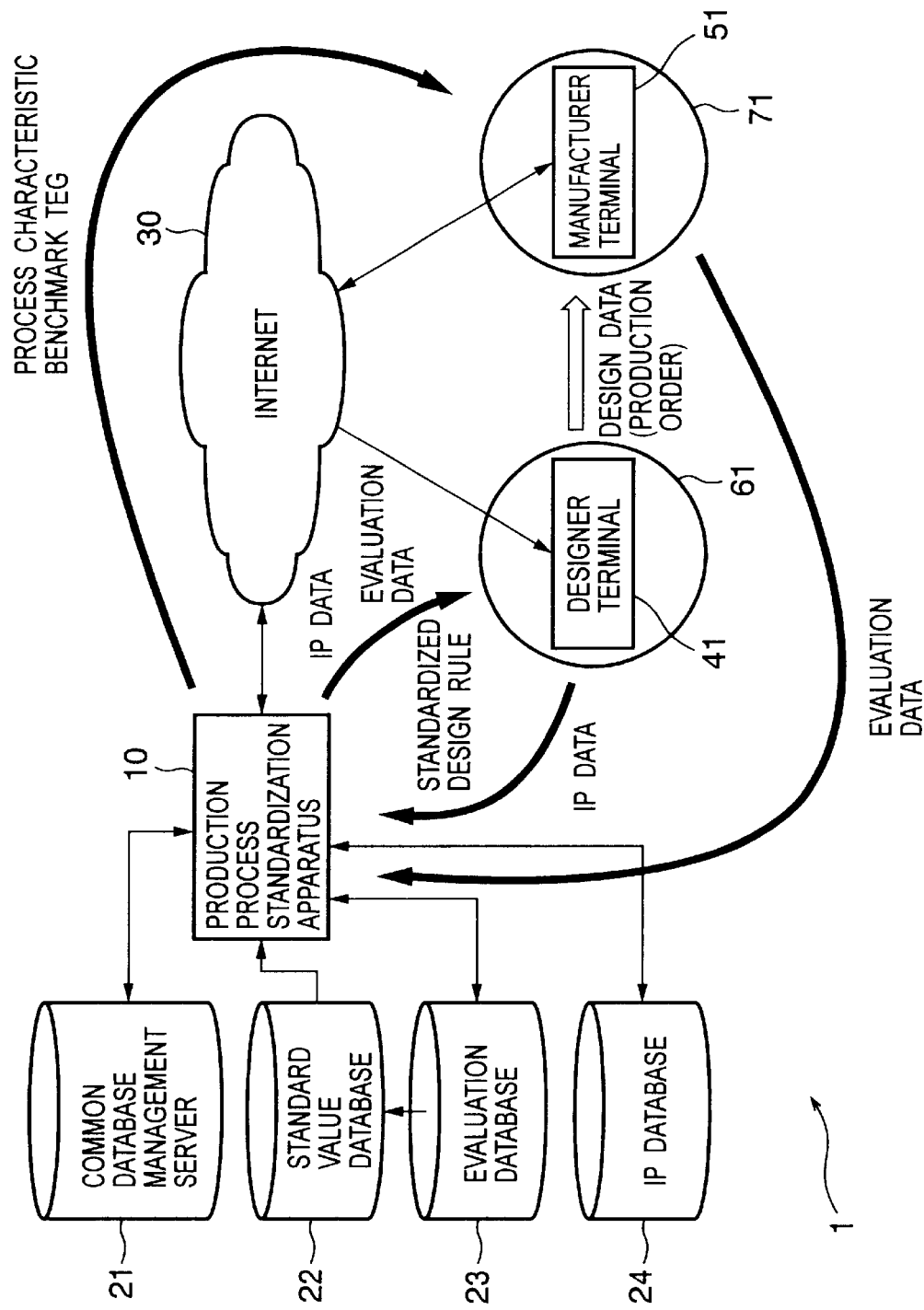

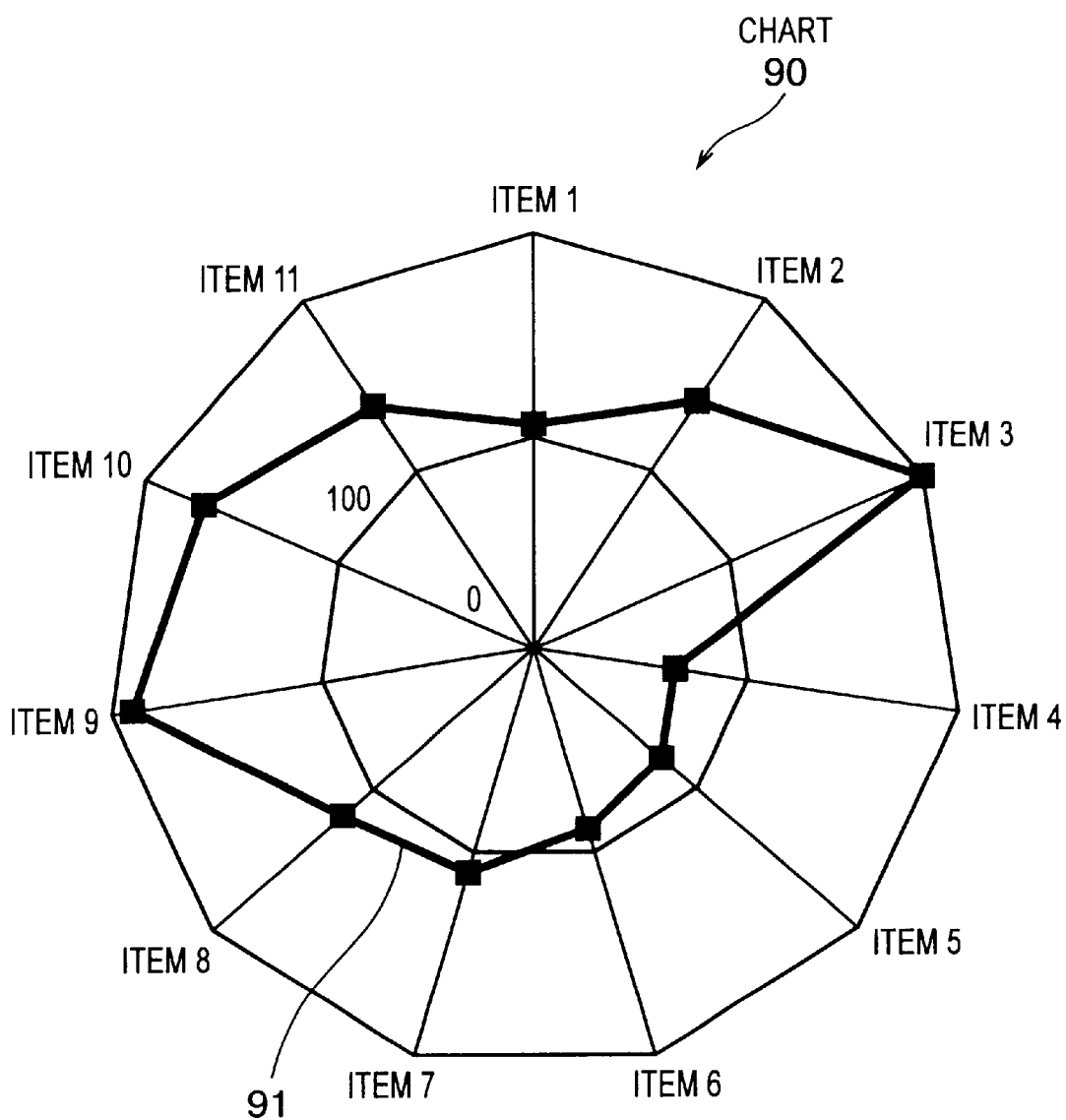

PRODUCTION PROCESS STANDARDIZATION SYSTEM OF SEMICONDUCTOR DEVICE AND METHOD OF SAME AND STORAGE MEDIUM STORING THAT METHOD

BACKGROUND OF THE INVENTION

1. Field of the Invention

The present invention relates to a production process standardization system and a production process standardization method for standardizing the production process of a semiconductor device and a computer readable storage medium storing a program for having a computer perform that function, more particularly relates to a production process standardization system and production process standardization method for standardizing the production process of a semiconductor device among a plurality of companies and a computer readable storage medium storing a program for having a computer perform the function.

2. Description of the Related Art

In general, a semiconductor device is designed according to design rules set corresponding to specifications of each generation of semiconductor device production apparatus. These design rules are individually set for each company matching with the production process of each company. The design rules set in this way are individually managed in each company. Due to this, in each company, basically it becomes possible to design and produce semiconductor devices having almost the same characteristics in the same company so far as the design follows the design rules managed in that company. Also, by managing and storing design data of the semiconductor devices designed according to these design rules within the company as design assets (IP), it becomes possible to re-use the design assets when newly designing semiconductor devices and it becomes possible to achieve a reduction of the design period and/or production process evaluation period, a reduction of design work, a reduction of costs, and so on.

However, design rules have been individually set for each company, so even for semiconductor devices produced by a production process of the same generation using a semiconductor device production apparatus of the same model, if the companies are different, the design rules thereof are also different, so the characteristics of the produced semiconductor devices become slightly different for every company. For this reason, for example, when a company designing a semiconductor device orders the production of the semiconductor device to a semiconductor device production company, the company designing the semiconductor device must find a semiconductor device production company having a production process capable of producing a semiconductor device that satisfies the required characteristics or acquire process information from the semiconductor device production company or predict circuit characteristics by simulation or the like and request a change of the production process from the semiconductor device production company so that the produced semiconductor device satisfies the required characteristics or change the design per se of the semiconductor device, so there is a problem in that enormous labor is required for ordering the production of a semiconductor device. This becomes a further conspicuous problem where for example the production of the semiconductor device is ordered to several different semiconductor device production companies.

Also, since the design rules differ for every company, when the design assets managed and stored by each company are to be shared with other companies, the design assets must be re-designed, evaluated, and verified to match with the production processes of the other companies, so there is a problem that design assets can not be smoothly distributed and re-used.

SUMMARY OF THE INVENTION

An object of the present invention is to provide a production process standardization system of a semiconductor device for standardizing design rules among companies and smoothening requests for production of semiconductor devices among companies.

Another object of the present invention is to provide a method for working the production process standardization system, that is, a production process standardization method of a semiconductor device.

Still another object of the present invention is to provide a computer readable storage medium storing a program for making a computer perform the processing of the production process standardization method of a semiconductor device.

Still another object of the present invention is to provide a second production process standardization system of a semiconductor device enabling smooth distribution and re-use of design assets among companies by standardizing the design rules among companies.

Still another object of the present invention is to provide a method for working the second production process standardization system, that is, a production process standardization method of a semiconductor device.

Still another object of the present invention is to provide a computer readable storage medium storing a program for making a computer perform the processing of the second production process standardization method of a semiconductor device.

According to a first aspect of the present invention there is provided a production process standardization system for standardizing the production process of a semiconductor device comprising a production process standardization apparatus having a standardized design rule information storage means for storing standardized design rule information indicating standardized design rules including standardized design conditions of the semiconductor device, and a standardized design rule information distributing means for distributing the standardized design rule information stored in the standardized design rule information storage means, and a designer terminal having a standardized design rule information receiving means for receiving the standardized design rule information distributed by the standardized design rule information distributing means.

According to a second aspect of the present invention there is provided a production process standardization method for standardizing the production process having the steps of commonly managing standardized design rules including standardized design conditions of the semiconductor device and having a plurality of designers design the semiconductor device following the commonly managed standardized design rules.

According to a third aspect of the present invention there is provided a computer readable storage medium storing standardized design rule information including standardized design conditions of a semiconductor device and storing a program for making a computer perform the function of distributing the stored standardized design rule information.

According to a fourth aspect of the present invention there is provided a computer readable storage medium storing a program for making a computer perform the function of receiving measurement data extraction circuit design information indicating design conditions of a measurement data extraction circuit for extracting measurement data from a semiconductor device and evaluation data calculation method information indicating a method of calculation of evaluation data including tabulated extracted measurement data and calculating the evaluation data from the measurement data of the semiconductor device extracted by the measurement data extraction circuit indicated in the received measurement data extraction circuit design information following the received evaluation data calculation method information.

BRIEF DESCRIPTION OF THE DRAWINGS

These and above objects and features of the present invention will become more apparent from the following description of the preferred embodiments given with reference to the attached drawings, wherein:

FIG. 1 is a view of the overall configuration of a production process standardization system of a semiconductor device according to a first embodiment of the present invention, FIG. 2 is a view of the detailed configuration of the production process standardization system of a semiconductor device illustrated in FIG. 1, FIGS. 3A and 3B are views of a fundamental concept of a standardized region of a production process production process realized by the production process standardization system of a semiconductor device according to an embodiment of the present invention, FIG. 4, consisting of FIGS. 4A to 4C, is a view of the fundamental concept of the standardized region of a production process production process realized by the production process standardized system of a semiconductor device according to an embodiment of the present invention.

FIG. 5 is a view of a flow of information in the production process standardization system of a semiconductor device according to an embodiment of the present invention, FIG. 11 is a view illustrating a chart prepared from the evaluation data according to an embodiment of the present invention.

DESCRIPTION OF THE PREFERRED EMBODIMENTS

Figure 3A:
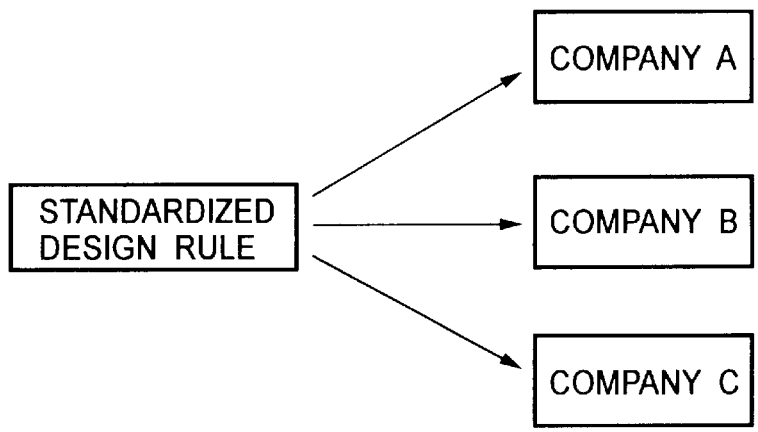

Below, an explanation will be made of embodiments of the present invention by referring to the attached drawings.

FIG. 1 is a view of the overall configuration of a production process standardization system 1 of a semiconductor device according to an embodiment of the present invention.

The production process standardization system 1 of a semiconductor device according to an embodiment of the present invention has a production process standardization apparatus 10 performing various processing in standardization of a production process. The production process standardization system 1 of a semiconductor device of the embodiment of the present invention has a common database management server 21 serving as a standardized design rule information storage means for storing standardized design rules indicating standardized design rules including standardized design conditions of the semiconductor device and simultaneously an evaluation information storage means for storing measurement data extraction circuit design information indicating design conditions of a measurement data extraction circuit for extracting measurement data of actual operating characteristics from a semiconductor device and an evaluation data calculation method information indicating a method of calculation of evaluation data comprised of tabulated extracted measurement data, a standard value database 22 serving as a standard value data storage means for commonly managing and storing standard value data of the evaluation data, an evaluation database 23 serving as an evaluation data storage means for storing the evaluation data, and an IP database 24 serving as a design asset data storage means for storing design data of a semiconductor device designed according to standardized design rules as design asset data. The production process standardization system 1 of the semiconductor device of the embodiment of the present invention further has the Internet 30 for transfer of various information, designer terminals 41 to 43 used by designers 61 to 63 each including a design company designing a semiconductor device, and manufacturer terminals 51 to 53 used by manufacturers 71 to 73 each including as a production company producing a semiconductor device. Namely, the production process standardization system 1 of the semiconductor device of the embodiment of the present invention is comprised of the above components.

Note that, in FIG. 1, for simplification of explanation, three designer terminals 41 to 43 corresponding to the designers 61 to 63 and three manufacturer terminals 51 to 53 corresponding to the manufacturers 71 to 73 are illustrated, but the numbers of the designers, designer terminals, manufacturers, and manufacturer terminals may be larger or smaller than this.

FIG. 2 is a view of the detailed configuration of the production process standardization system 1 of an embodiment of the present invention. Note that, the configuration of the designer terminal 41 is similar to those of the designer terminals 42 and 43, and the configuration of the manufacturer terminal 51 is similar to those of the manufacturer terminals 52 and 53, so illustration of the designer terminals 42 and 43 and manufacturer terminals 52 and 53 is omitted in FIG. 2.

The production process standardization apparatus 10 is mainly comprised of a standardized design rule information extracting means 10a for extracting standardized design rule information from the common database management server 21, a process characteristic benchmark TEG information extracting means 10b for extracting process characteristic benchmark TEG information comprised of measurement data extraction circuit design information and evaluation data calculation method information from the common database management server 21, standard value data extracting means 10c for extracting standard value data from the standard value database 22, evaluation data extracting means 10d for extracting evaluation data from the evaluation database 23, information transmitting means 10e serving as a standardized design rule information distributing means for distributing the standardized design rule information, as an evaluation information distributing means for distributing the measurement data extraction circuit design information and the evaluation data calculation method information, as a standard value data distributing means for distributing standard value data, as an evaluation data distributing means for distributing evaluation data, and as a design asset data distributing means for distributing the design asset data stored in the design asset data storage means, information receiving means 10f serving as an evaluation data receiving means for receiving the transmitted evaluation data and as a design asset data tabulating means for receiving the transmitted design asset data, evaluation data storage means 10g for storing the received standard data in the evaluation database 23, IP data storage means 10h for storing the received design asset data in the IP database 24, and IP data extracting means 10i for extracting the design asset data from the IP database 24.

The designer terminal 41 is mainly comprised of an information receiving means 41a serving as a standardized design rule information receiving means for receiving the distributed standardized design rule information, as an evaluation data receiving means for receiving the distributed evaluation data, and as a design asset data receiving means for receiving the distributed design asset data, information outputting means 41b for outputting the standardized design rule information by the information receiving means 41a, IP data inputting means serving as a design asset data inputting means for inputting the design asset data, and information transmitting means 41d serving as a design asset data transmitting means for transmitting the input design asset data.

The manufacturer terminal 51 is mainly comprised of a measurement database 51a for storing the measurement data of the produced semiconductor device, measurement data extracting means 51b for extracting the measurement data from the measurement database 51a, information receiving means serving as an evaluation information receiving means for receiving the distributed measurement data extraction circuit design information and evaluation data calculation method information and as a standard value data receiving means for receiving the distributed standard value data, evaluation data calculating means 51d for calculating the evaluation data from the measurement data of the semiconductor device extracted by the measurement data extracting means indicated in the received measurement data extraction circuit design information according to the received evaluation data calculation method information, information transmitting means 51e serving as an evaluation data transmitting means for transmitting the calculated evaluation data, and information outputting means 51f for outputting the information received by the information receiving means 51c.

The production process standardization apparatus 10 is connected via the standardized design rule information extracting means 10a and the process characteristic benchmark TEG information extracting means 10b to the common database management server 21, via the standard value extracting means 10c to the standard value database 22, via the evaluation data extracting means 10d and the evaluation data storage means 10g to the evaluation database 23, via the IP data storage means 10h and the IP data extracting means 10i to the IP database 24, and via the information transmitting means 10e and the information receiving means 10f to the Internet 30 so that communication is possible. Also, the designer terminal 41 is connected via the information receiving means 41a and the information transmitting means 41d to the Internet 30, while the manufacturer terminal 51 is connected via the information receiving means 51c and the information transmitting means 51e to the Internet 30 so that communication is possible.

Here, the standardized design rule information means information indicating standardized design rules including standardized design conditions of the semiconductor device mentioned above and is comprised of two-dimensional design rule information indicating a circuit layout of the semiconductor device and circuit characteristic parameter information indicating a model of the characteristics of the circuit. As the circuit characteristic parameter information, use is made of for example basic parameters of a circuit simulator SPICE.

The process characteristic benchmark TEG information means a group of evaluation tools used for evaluation of the characteristics of the produced semiconductor device and is comprised of measurement data extraction circuit information indicating design conditions of the measurement data extraction circuit for extracting the measurement data from the semiconductor device and evaluation data calculation method information indicating the method for calculating the evaluation data comprised of the tabulated measurement data extracted by the measurement data extraction circuit. The measurement data extraction circuit means a circuit standardized corresponding to the standardized design rules formed inside the semiconductor device for evaluating the characteristics of the semiconductor device and has a characteristic evaluation circuit unit for extracting the characteristics of the semiconductor device and a numerical value conversion circuit unit for converting the output from the characteristic evaluation circuit unit to numerical values. Details of this will be given later. Also, as an example of the measurement data extraction circuit information, other than the design data per se of the measurement data extraction circuit, information for specifying the predetermined measurement data extraction circuit is contained. The evaluation data calculation method information means information indicating the calculation method for tabulating the evaluation data obtained by tabulating the measurement data extracted by the measurement data extraction circuit by a standardized format. Concretely, for example, a program for making a computer calculate the evaluation data corresponds to this evaluation data calculation method information.

The measurement data means information indicating the characteristics of the semiconductor device extracted by the measurement data extraction circuit and concretely is information indicating variability in characteristics of the overall semiconductor device integration circuit due to fluctuation factors such as an interconnection capacitor and an interconnection resistor of an interconnection pattern formed in the semiconductor device, power supply noise, and a transistor capability ratio. Details of this will be explained later.

The evaluation data means information obtained by tabulating the extracted evaluation data for every manufacturer or every production line, that is, data evaluating the characteristics of the semiconductor devices produced in them in units of the related manufacturers or production lines. Note that, in the present embodiment, for facilitating a comparison among manufacturers or production lines, the method of calculation of the evaluation data is standardized. Concretely, a mean value of the measurement data for every evaluation item is calculated in units of the manufacturers or production lines, and a deviation value of the calculated mean value is defined as the evaluation data. Details of this will be explained later.

The standard value data is data indicating the standard value of the evaluation data sent from the manufacturer terminals 51 to 53 and is generated by calculating the mean value of the evaluation data stored in the evaluation database 23.

The design assets mean the stored design data of the designed semiconductor devices. A reduction of the design work and design costs is achieved by using these design assets at the time of designing a new semiconductor device. Also, the design asset data means the design data stored in this way. In the present embodiment, the design data of semiconductor devices designed according to the standardized design rules is stored and used as the design asset data. Note that the design data stored as the design asset data may be managed in units of functional blocks of the semiconductor device or may be managed in units smaller or larger than that or for every other component.

Next, an explanation will be made of the fundamental concept of the standardized region of a semiconductor device production process realized by the production process standardization system 1 of a semiconductor device according to this embodiment of the present invention.

Figure 3B:
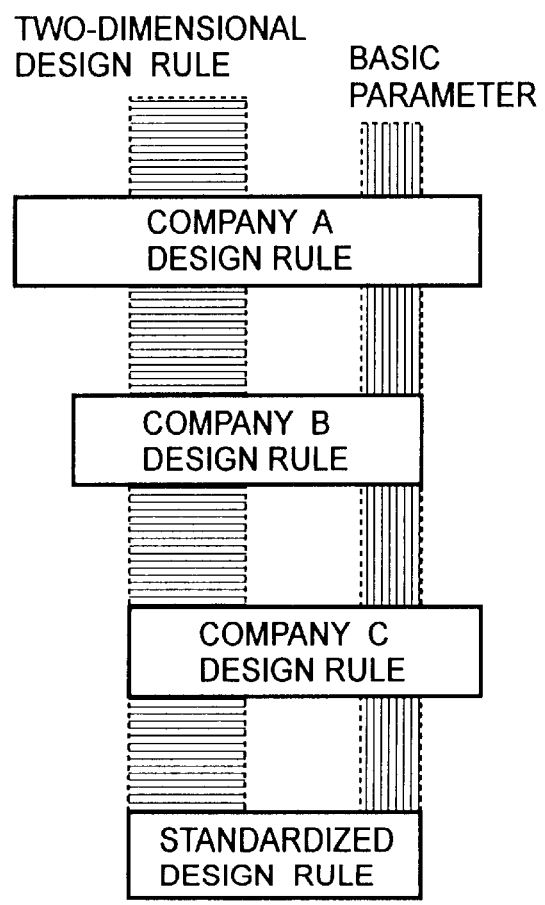
Figure 4A:
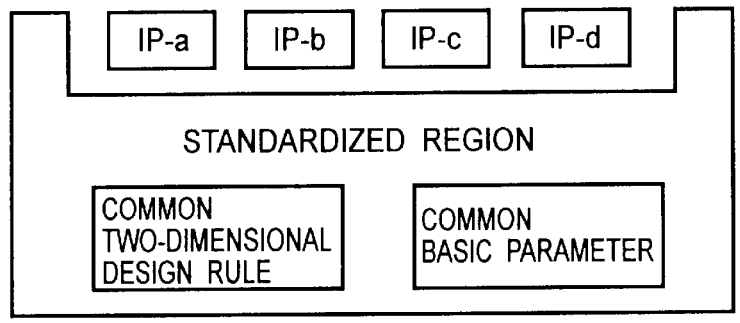
Figure 4B:
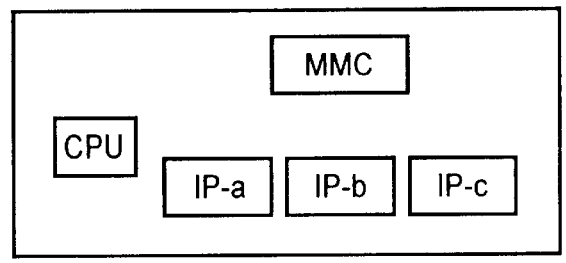
Figure 4C:
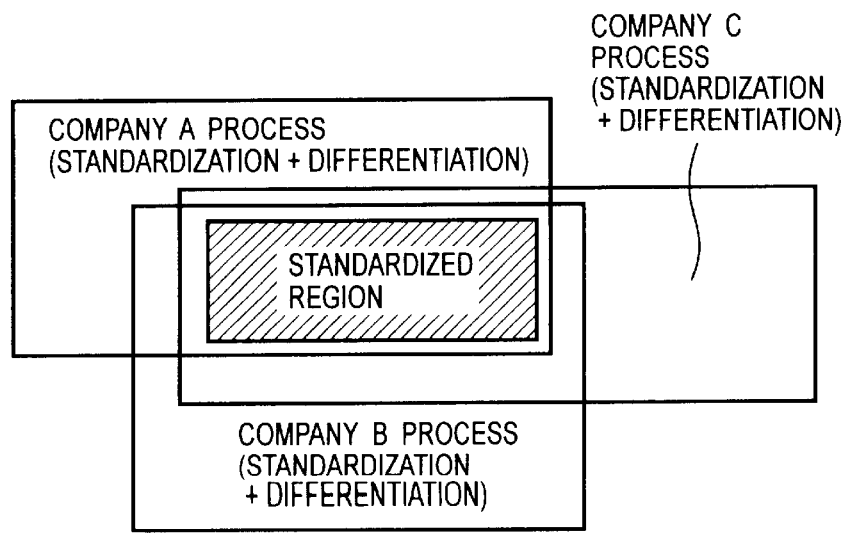

FIGS. 3A and 3B and FIGS. 4A to 4C are views of the fundamental concept of the standardized region of a semiconductor device production process realized by the production process standardization system 1. Here, FIGS. 3A and 3B are views of the standardization of the design rules, while FIGS. 4A to 4C are views of the format of the distribution and/or re-use of the design assets realized by the standardization of the design rules.

As shown in FIG. 3A, in the production process standardization system 1, the standardized design rules including the standardized design conditions of a semiconductor device are provided to a plurality of different companies (company A, company B, and company C). The company A, company B, and company C provided with the standardized design rules are companies concluding a predetermined contract for standardizing the design rules in advance. These companies comprise a predetermined group by the contract.

As shown in FIG. 3B, the company A, company B, and company C provided with the standardized design rules comprised of the two-dimensional design rules and basic parameters share the provided standardized design rules to determine the design rules of the companies. Due to this, among these companies, it becomes possible to standardize the production process and realize orders of production to other companies and the distribution and re-use of design assets across companies without requiring work such as re-design.

As shown in FIG. 4A, the company A, company B, and company C develop, evaluate, and verify design properties (IP-a, IP-b, IP-c, IP-d) based on the provided standardized design rules (common two-dimensional design rules and common basic parameters). It becomes possible to easily distribute and re-use various types of design properties constructed in this way among the company A, company B, and company C. Effective utilization of the design properties among the company A, company B, and company C can be achieved.

FIG. 4B is a conceptual view illustrating a semiconductor device incorporating the design assets standardized as mentioned above.

In the example of FIG. 4B, three design properties (IP-a, IP-b, IP-c) are selected and incorporated into the design of a semiconductor device.

By doing this, it becomes possible for the company A, company B, and company C to construct a standardized region of the production processes of the companies by making the region of part of the production processes of the companies correspond to the standardized design rules as shown in FIG. 4C, and it becomes possible to reduce the work of the construction of a new production process. In portions other than the standardized process, use is made of differentiated processes peculiar to each company. The company A, company B, and company C differentiate their production processes from the other companies by these differentiated processes. In the case of the same company, however, there is no great difference between the differentiated processes and the process of the standardized region. Also, the design data can be relatively easily used for the differentiated processes.

Next, an explanation will be made of the operation of the production process standardization system 1 of the embodiment of the present invention.

FIG. 5 is a view of the flow of the information in the production process standardization system 1.

First, the production process standardization apparatus 10 provides the standardized design rules stored in the common database management server 21 via the Internet 30 to the designer terminal 41 used by a designer 61. The designer 61 provided with the standardized design rules designs a semiconductor device satisfying the predetermined required characteristics according to the standardized design rules. The design may be newly carried out, but it is also possible if the production process standardization apparatus 10 provides the design asset data (IP data) comprised of as the design assets stored in the IP database 24 to the designer terminal 41 via the Internet 30 and the designer 61 uses the provided design asset data to design the semiconductor device. Also, the design data may also be provided to the production process standardization apparatus 10 as design asset data after the end of the design and stored in the IP database 24.

The designer 61 finishing the design of the semiconductor device obtains evaluation data of the semiconductor devices produced by manufacturers and selects the manufacturer for ordering the production of the designed semiconductor device. The evaluation data is acquired by the production process standardization apparatus 10 providing the evaluation data stored in the evaluation database 23 to the designer terminal 41 via the Internet 30. Also, the evaluation data provided is evaluation data obtained by each manufacturer measuring the characteristics of the semiconductor device produced by that manufacturer by using the process characteristic benchmark TEG provided to each manufacturer by the production process standardization apparatus 10 and calculating the data therefrom and is data stored in the evaluation database 23 together. Also, the manufacturer is selected based on the provided evaluation data by deciding how optimally the production process of that manufacturer can produce the semiconductor device designed by the designer 61 so as to satisfy the predetermined required characteristics. For example, when the manufacturer 71 is selected by this decision, the designer 61 provides the design data to the manufacturer 71 and orders the production of the semiconductor device.

The manufacturer 71 receiving the order produces the semiconductor device indicated in that design data. Also, it calculates the evaluation data of the produced semiconductor device by using the process characteristic benchmark TEG provided from the production process standardization apparatus 10 via the Internet 30 and provides the calculated evaluation data via the Internet 30 to the production process standardization apparatus 10. Note that details of the method of calculation of the evaluation data will be explained later.

The evaluation data provided to the production process standardization apparatus 10 is stored in the evaluation database 23. The standard value data of the standard value database 22 is updated by taking the evaluation data newly stored in the evaluation database 23 into account.

Next, a detailed explanation will be made of the operation of the production process standardization system 1 by referring to FIG. 1, FIG. 2, and FIG. 5.

A designer 61 about to design a semiconductor device requests the distribution of the standardized design rule information from the production process standardization apparatus 10. The production process standardization apparatus 10 receiving this request extracts the standardized design rule information stored in the common database management server 21 by the standardized design rule information extracting means 10a and transmits the extracted standardized design rule information by the information transmitting means 10e. The transmitted standardized design rule information is received by the information receiving means 41a of the designer terminal 41 used by the designer 61 via the Internet 30. The received standardized design rule information is output by the information outputting means 41b. The output standardized design rule information is inspected by the designer 61. The designer 61 designs the semiconductor device according to the standardized design rules indicated in the output standardized design rule information.

When the designer 61 designs the semiconductor device by using the design properties stored in the IP database 24, the designer 61 selects the design asset data to be used from the design asset data stored in the IP database 24 and requests the distribution of the design asset data from the production process standardization apparatus 10. The production process standardization apparatus 10 receiving this request extracts the requested design asset data from the IP database 24 by the IP data extracting means 101 and distributes the extracted design asset data by the information transmitting means 10e. The distributed design asset data is received by the information receiving means 41a of the designer terminal 41 and output by the information outputting means 41b. The designer 61 designs the semiconductor device incorporating this output design asset data according to the provided standardized design rules.

After the end of the design of the semiconductor device, when storing part or all of the design data as the design assets, the designer 61 inputs the design data to be stored as the design assets by using the IP data inputting means 41c. The input design asset data is transmitted by the information transmitting means 41d. The transmitted design asset data is received via the Internet 30 by the information receiving means 10f of the production process standardization apparatus 10. The design asset data received by the information receiving means 10f is stored in the IP database 24 by the IP data storage means 10h and stored as the design assets.

The designer 61 finishing the design of the semiconductor device selects the manufacturer for ordering the production of the semiconductor device to. When selecting the manufacturer, first, the designer 61 requests the distribution of the evaluation data of the manufacturers from the production process standardization apparatus 10. The production process standardization apparatus 10 receiving this request extracts the evaluation data of the manufacturers stored in the evaluation database 23 by the evaluation data extracting means 10d and transmits the extracted evaluation data by the information transmitting means 10e. The transmitted evaluation data is received via the Internet 30 by the information receiving means 41a of the designer terminal 41 and output by the information outputting means 41b. The output evaluation data is inspected by the designer 61. The designer 61 selects the manufacturer having the production process optimum for the required characteristics by comparing and investigating the inspected evaluation data and orders the production to that manufacturer. Note that, here, the production processes of the manufacturers 71 to 73 have the standardized region of the production process corresponding to the standardized design rules as shown in FIG. 4C. Also, as mentioned above, the semiconductor device of the designer 61 is designed according to the standardized design rules. For this reason, when producing the semiconductor device designed by the designer 61 mentioned above by the production processes of the manufacturers 71 to 73, no matter which production process of the manufacturers 71 to 73 is used, it can be expected to produce semiconductor devices satisfying the required characteristics to a certain extent. The selection of the manufacturer here selects the manufacturer most satisfying the required characteristics from among such manufacturers 71 to 73. Also, as will be explained later, the evaluation data compared and investigated here is the data measured and calculated under the same conditions based on the standardized measurement data extraction circuit design information and evaluation data calculation method information, so the designer 61 can precisely and smoothly compare and investigate the evaluation data.

Here, when the manufacturer 71 is selected, the designer 61 provides the design data of the semiconductor device for ordering the production to the manufacturer 71. The manufacturer 71 produces the semiconductor device indicated in that design data by using the production process provided by that manufacturer.

The manufacturer 71 makes a prototype of the semiconductor device with the measurement data extraction circuit indicated in the measurement data extraction circuit design information of the process characteristic benchmark TEG information built therein every predetermined period in order to provide the evaluation data. This process characteristic benchmark TEG information is the information stored in the common database management server 21 and is the information extracted from the common database management server 21 by the process characteristic benchmark TEG information extracting means 10b in response to the request of the manufacturer 71, distributed by the information transmitting means 10e via the Internet 30, received by the information receiving means 51c, and output by the information outputting means 51f.

The measurement data of that semiconductor device from the semiconductor device with the measurement data extraction circuit formed therein in this way is extracted by that measurement data extraction circuit. The measurement data extracted in this way is sequentially stored in the measurement database 51a.

When the extraction and storage of the measurement data in a predetermined number of semiconductor devices end in this way, the evaluation data is calculated. The evaluation data is calculated according to the evaluation data calculation method indicated in the evaluation data calculation method information provided in the process characteristic benchmark TEG information distributed from the production process standardization apparatus 10 and received by the information receiving means 51c. The evaluation data calculated in this way is transmitted by the information transmitting means 51e via the Internet 30 and received by the information receiving means 10f of the production process standardization apparatus 10. The received evaluation data is stored in the evaluation database 23 by the evaluation data storage means 10g. At this time, the standard value data stored in the standard value database 22 may be updated by taking the evaluation data newly stored in the evaluation database 23 into account.

Next, an explanation will be made of a concrete example of the measurement data extraction circuit.

Figure 6:
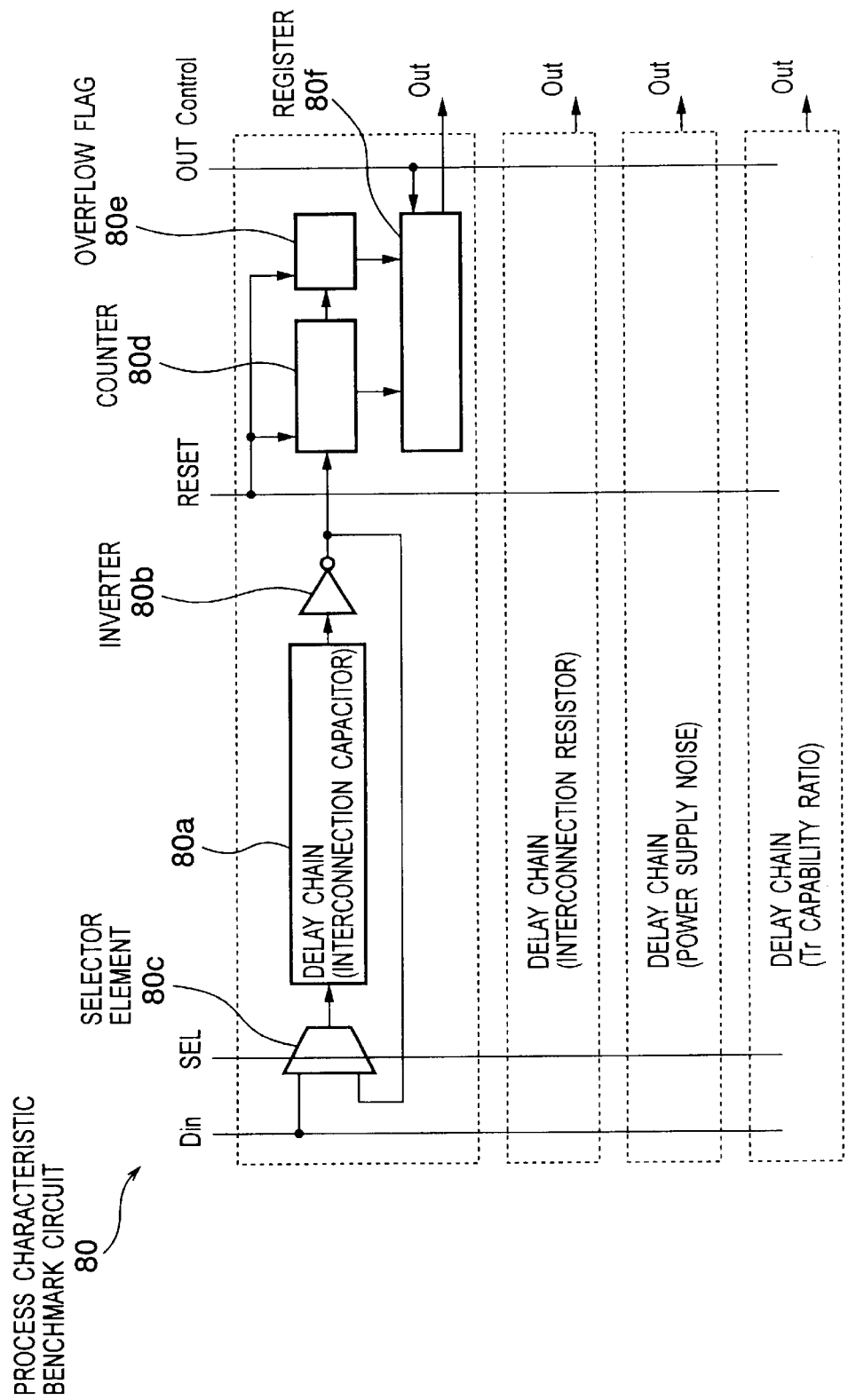
FIG. 6 is a view of a process characteristic benchmark circuit as a concrete example of a measurement data extraction circuit according to an embodiment of the present invention.

FIG. 6 is a view of a process characteristic benchmark circuit 80 of a concrete example of the measurement data extraction circuit of the embodiment of the present invention.

The process characteristic benchmark circuit 80 is comprised of a delay chain 80a comprising a characteristic evaluation circuit unit for extracting the characteristics of the semiconductor device, inverter 80b, selector element 80c, counter 80d comprising a numerical value conversion circuit unit for converting to numerical values the output from the characteristic evaluation circuit unit, overflow flag 80e, and register 80f and outputs the measured characteristics of the semiconductor devices as the measurement data converted to numerical values for every item of evaluation of characteristics.

The delay chain 80a and the inverter 80b comprise a ring oscillator. Deviation of the characteristics of the delay chain 80a can be detected as the deviation of the oscillation frequency of the ring oscillator. Note that, the ring oscillator comprised of the delay chain and the inverter is formed for every evaluation item, for example, the interconnection capacitor, interconnection resistor, power supply noise, transistor (Tr) capability ratio, and interconnection noise. Each ring oscillator outputs each evaluation characteristic as deviation of the oscillation frequency.

The counter 80d, overflow flag 80e, and the register 80f measure the output of the ring oscillator comprised of the delay chain 80a and the inverter 80b for a predetermined time and output the measured results, that is, counter values, as the measurement data. By this, by replacing the characteristics of the semiconductor devices by the counter values, the characteristics of the semiconductor devices are converted to numerical values. Also, a counter, overflow flag, and register comprising the numerical value conversion circuit unit are comprised for every ring oscillator corresponding to each evaluation item and can obtain different counter values for every evaluation item.

Next, an explanation will be made of the operation of the process characteristic benchmark circuit 80.

When evaluating the characteristics of the semiconductor device wherein the process characteristic benchmark circuit 80 is comprised, first the counter 80d and the overflow flag 80e are reset by a reset signal. Next, a selector signal is given to the selector element 80c, a fixed value is input from outside the selector element 80c, and the delay chain 80a is reset. Thereafter, the selector element 80c is switched and connected to the input of the feedback side so as to comprise the ring oscillator, but the input value on the feedback side is designed so as to be a value inverse to the initially input fixed value, so this ring oscillator starts the oscillation. The output of the ring oscillator is counted by the counter 80d for a predetermined time, and the measurement result is stored in the register 80f as the counter value. Here, when the measured count exceeds a permissible measurement capacity of the counter 80d, the overflow flag 80e is utilized. After the end of the measurement, the counter value stored in the register 80f is output. This counter value becomes part of the measurement data.

The above operation is carried out also in the other ring oscillator comprised for every evaluation item. After the end of the measurement, counter values corresponding to the ring oscillators are individually output. The set of the counter value for every evaluation item output in this way is utilized as the measurement data.

FIGS. 7A to 7D and FIGS. 8A to 8B are views of concrete examples of ring oscillators 81 to 86 comprising the process characteristic benchmark circuit 80.

Figure 7A:
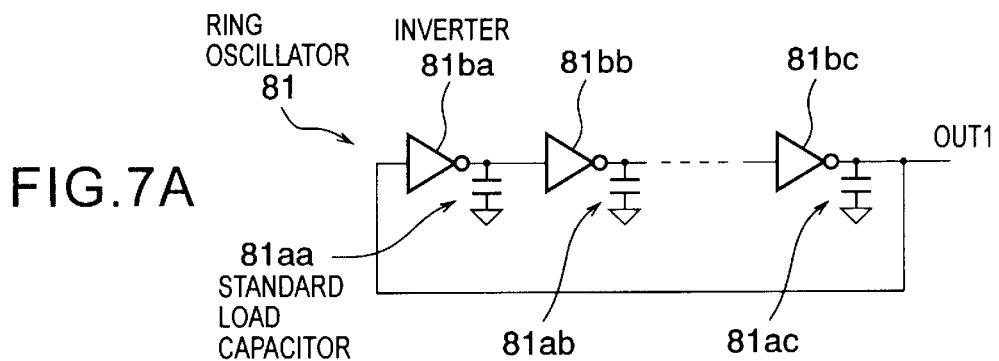
FIGS. 7A to 7D are views of concrete examples of a ring oscillator comprising a process characteristic benchmark circuit according to an embodiment of the present invention.

FIG. 7A shows the ring oscillator 81 for detecting the difference of the characteristics due to the circuit configuration and is comprised of standard load capacitors 81aa to 81ac determined in advance so that only the difference of this circuit configuration appears as deviation of the oscillation frequency and a plurality of inverters 81ba to 81bc. This ring oscillator 81 measures the most basic characteristic by providing only the standard delay factor.

Figure 7B:
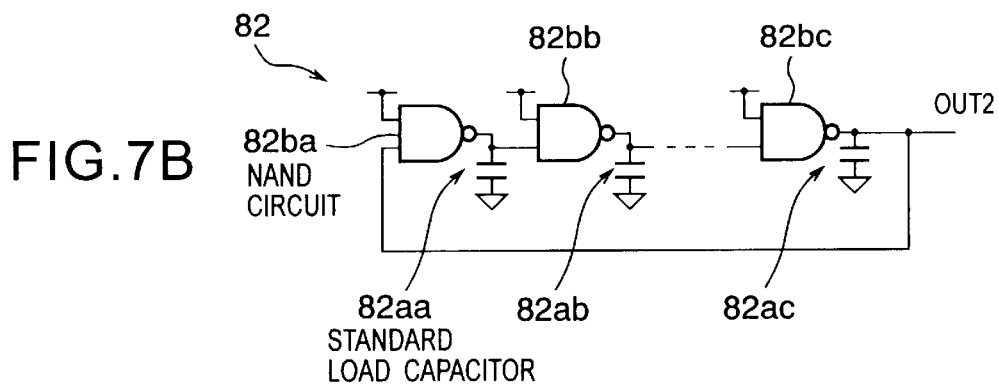

FIG. 7B shows a ring oscillator 82 for detecting the difference of the characteristics due to the circuit configuration and is comprised of standard load capacitors 82aa to 82ac determined in advance so that only the difference of this circuit configuration appears as deviation of the oscillation frequency and a plurality of NAND circuits 82ba to 82bc.

Figure 7C:
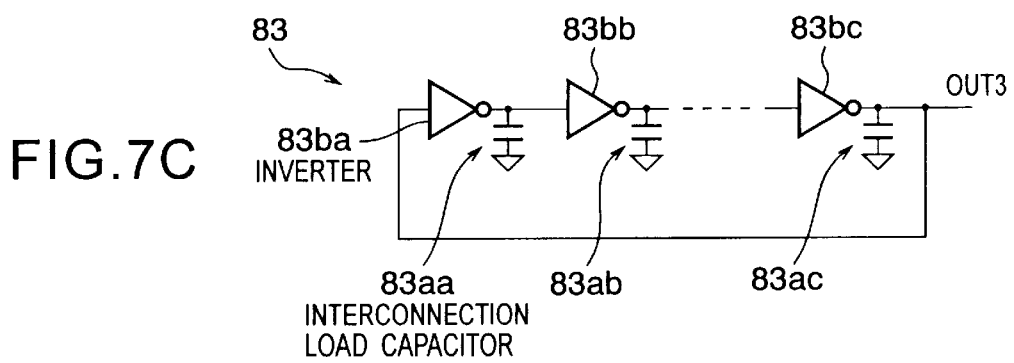

FIG. 7C shows a ring oscillator 83 for detecting the difference of the interconnection capacitor and is comprised of interconnection load capacitors 83aa to 83ac of the semiconductor device of the delay chain and a plurality of inverters 83ba to 83bc.

Figure 7D:
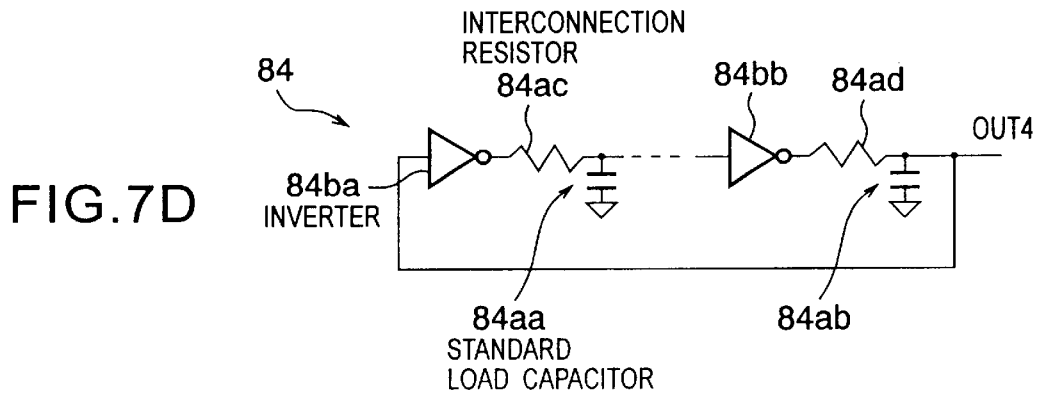

FIG. 7D shows a ring oscillator 84 for detecting the difference of the interconnection resistor and is comprised of interconnection resistors 84ac and 84ad of the semiconductor device, standard load capacitors 84aa and 84bb determined in advance so that only the difference of the interconnection resistor appears as deviation of the oscillation frequency and a plurality of inverters 84ba and 84bb.

Figure 8A:
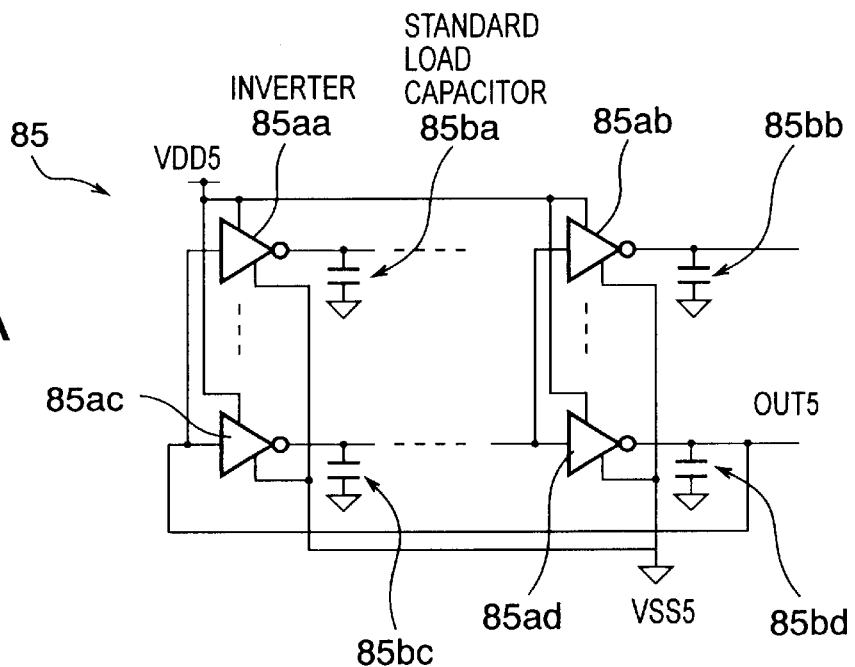
FIGS. 8A and 8B are views of concrete examples of a ring oscillator comprising a process characteristic benchmark circuit according to an embodiment of the present invention.

FIG. 8A shows a ring oscillator 85 for detecting the power supply noise and is comprised of standard load capacitors 85ba to 85bd determined in advance so that only the difference of the power supply noise appears as deviation of the oscillation frequency and a plurality of inverters 85aa to 85ad. In the ring oscillator 85, the power supply noise is observed by installing a circuit mimicking an internal bus and a bus driver and detecting deterioration of transistor storage performance due to a source-drain voltage reduced due to glitch noise on a power supply line at the time of switching.

Figure 8B:
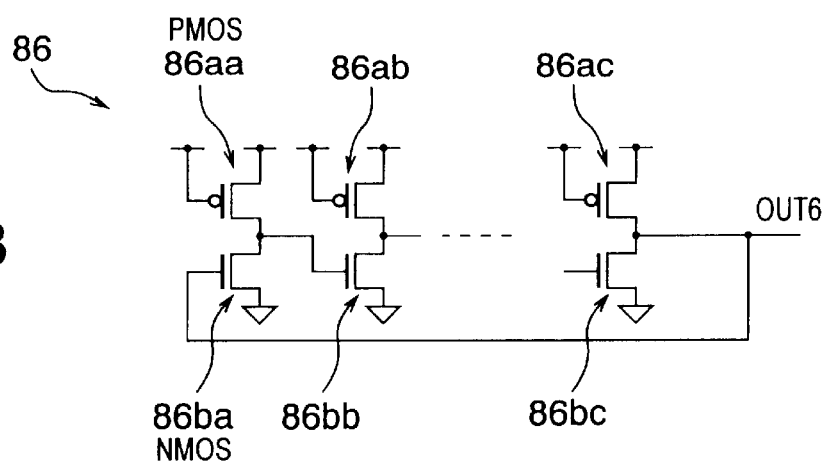

FIG. 8B shows a ring oscillator 86 for detecting deviation of the transistor capability ratio between the PMOS's and NMOS's. The inverters are comprised of the PMOS's 86aa to 86ac and NMOS's 86ba to 86bc to be measured. In the ring oscillator 86, the characteristic ratio among the PMOS's 86aa to 86ac and NMOS's 86ba to 86bc during the production process and the difference of the deviation of the transistor characteristics such as the gate length and gate width can be observed.

Figure 9:
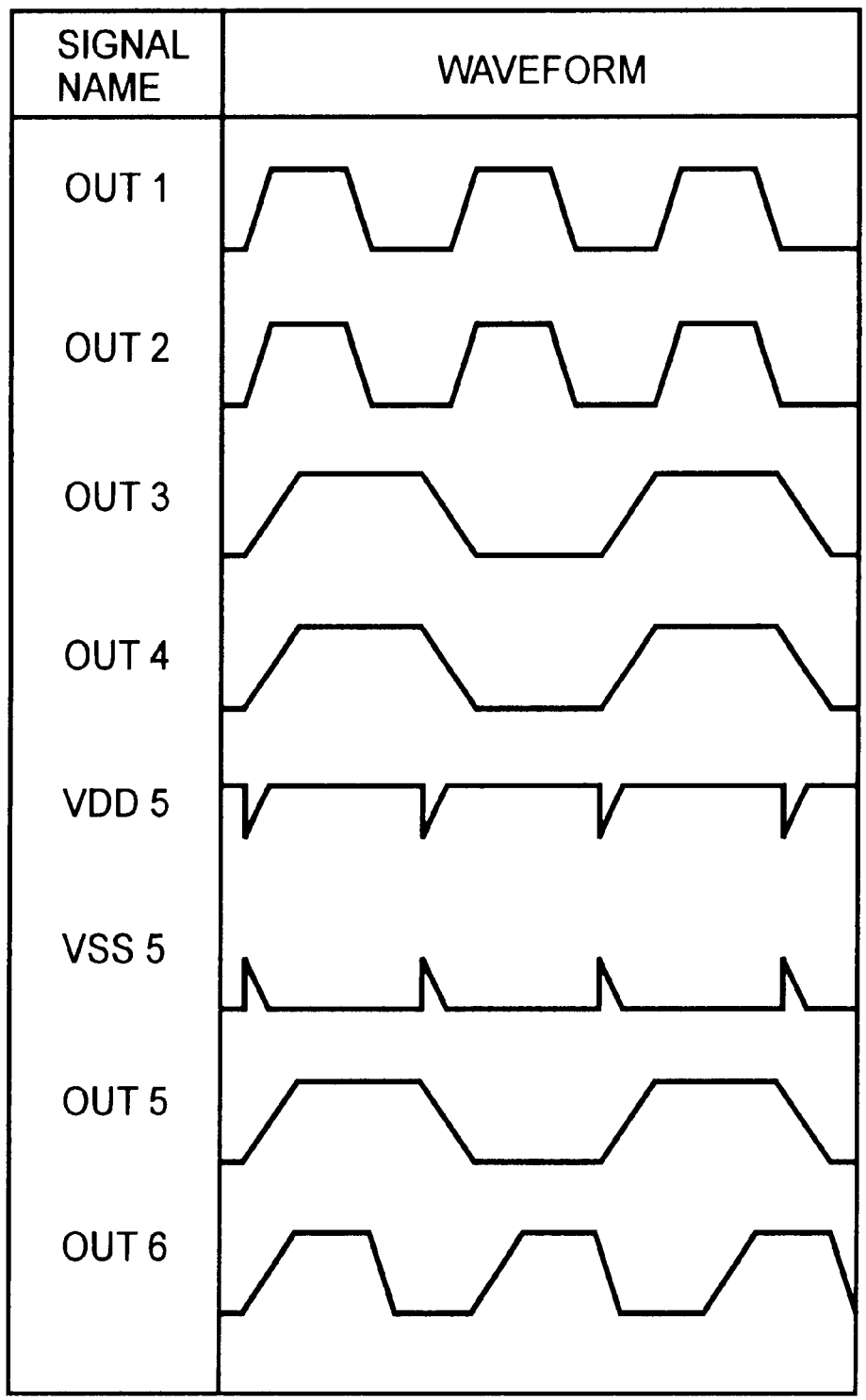
FIG. 9 is a view of a model of internal signals due to a difference of characteristics of ring oscillators according to an embodiment of the present invention.

For clearly indicating the effect due to the difference of these circuits, a model of internal signals according to the difference of characteristics of the ring oscillators 81 to 86 is shown in FIG. 9.

Next, an explanation will be made of a concrete example of the evaluation data calculation method indicated in the evaluation data calculation method information.

Figure 10:
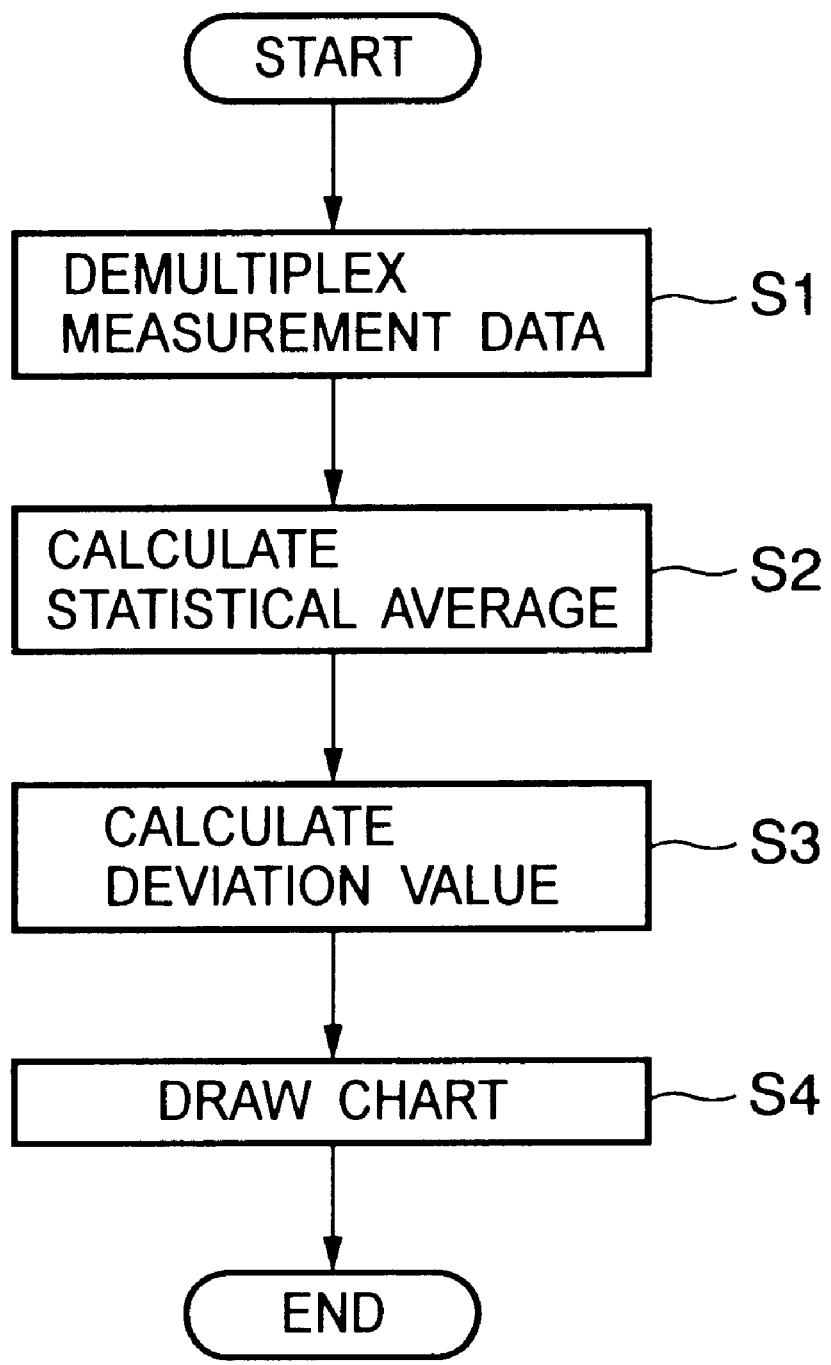
FIG. 10 is a flowchart illustrating an evaluation data calculation method indicated in evaluation data calculation method information according to an embodiment of the present invention.

FIG. 10 is a flowchart exemplifying the evaluation data calculation method indicated in the evaluation data calculation method information.

In this example, it is assumed that the evaluation data calculation method information is a program for making a computer calculate the evaluation data by the evaluation data calculation method. The evaluation data is calculated by the computer reading this program.

In this evaluation data calculation method, the evaluation data obtained by normalizing the measurement data so that the measurement data measured by the manufacturers can be compared with a similar evaluation reference is calculated. When calculating the evaluation data, first the measurement data stored in the measurement database 51a is extracted by the measurement data extracting means 51b. Next, the evaluation data calculating means 51d separates the extracted measurement data for every evaluation item (step S1) and calculates a statistical average for every evaluation item (step S2). Next, by using the calculated statistical average and the standard value data, the deviation value of the measurement data is calculated as the evaluation data (step S3). Note that, the standard value data used here is the standard value data stored in the standard value database 22 and is the data extracted from the standard value database 22 by the standard value data extracting means 10c in response to the request of the manufacturer, distributed via the Internet 30 by the information transmitting means 10e, and received by the information receiving means 51c. Next, a chart is prepared by using the evaluation data calculated in this way (step S4). FIG. 11 is a view illustrating a chart 90 prepared in this way.

In the chart 90, the evaluation data of the semiconductor device is shown as a deviation value 91 for every evaluation item. By indicating the evaluation data by a chart in this way, the comparison of the evaluation data becomes easy.

In this way, in the embodiment of the present invention, since the standardized design rules of a semiconductor device are commonly managed and a plurality of companies design the semiconductor device according to the commonly managed design rules, so long as a company has a production process constructed based on the standardized design rules, it becomes possible to request production of a semiconductor device without changes in the design or changes in the production process etc. and requests for production of semiconductor devices among companies can be smoothened.

Also, since the standardized design rules of a semiconductor device are commonly managed and a plurality of companies design the semiconductor device according to the commonly managed design rules, it becomes possible to utilize the design data of the designed semiconductor device as design assets across companies, so the use and re-use of the design properties stored by companies are smoothened, and it becomes possible to effectively utilize design assets.

Note that, the above processing functions can be realized by computers. In this case, the contents of the processing of functions to be provided in the production process standardization apparatus 10, designer terminals 41 to 43, and manufacturer terminals 51 to 53 are described in a program stored on the computer readable storage medium. Then, by executing this program by a computer, the above processing is realized by the computer. As the computer readable storage medium, there are a magnetic storage device, semiconductor device memory, etc. When the media are distributed over the market, the program can be distributed by storing it in a portable storage medium such as a compact disk read only memory (CD-ROM) or floppy disk. It is also possible to store them in a memory device of a computer connected via a network and transfer the same to the other computer via the network. When the computer execute the program, the program is stored in a hard disk drive or the like in the computer, loaded in a main memory, and executed.

Also, in the embodiment of the present invention, the present system was used for standardizing the design rules among the companies, but it is also possible to use the present system to provide standardized design rules to designers in the same company or individual designers outside the bounds of the company. In this case, the designers 61 to 63 are individual designers, and the designer terminals 41 to 43 become terminals to be used by the individual designers.

Further, in the embodiment of the present invention, the design asset data was stored and managed in the IP database together, but the design asset data may also be stored and managed for every company and each company freely access the design asset data of the other companies.

Also, in the embodiment of the present invention, the Internet 30 was used for the transfer of various information such as the standardized design rule information, but it is also possible to use LAN and the other telecommunicating means and possible to transfer these information by using storage media such as CDs and DVDs.

Summarizing the effects of the invention, as explained above, in the present invention, the standardized design rules of the semiconductor device are commonly managed and a plurality of companies design a semiconductor device according to the commonly managed design rules, so it becomes possible to request the production of a semiconductor device without changing the design or changing the production process etc. and requests for production of a semiconductor device among companies can be smoothened so long as the companies have production processes constructed based on this standardized design rule.

Also, in the present invention, the standardized design rules of a semiconductor device are commonly managed and a plurality of companies design the semiconductor device according to the commonly managed design rules, so it becomes possible to utilize the design data of the designed semiconductor device as design assets across companies and the use and re-use of the design properties stored by companies are smoothened and it becomes possible to effectively utilize the design assets.

While the invention has been described with reference to specific embodiments chosen for purpose of illustration, it should be apparent that numerous modifications could be made thereto by those skilled in the art without departing from the basic concept and scope of the invention.

What is claimed is:

1. A production process standardization system for standardizing the production process of a semiconductor device comprising:
   a production process standardization apparatus having
   a standardized design rule information storage means for storing standardized design rule information indicating standardized design rules including standardized design conditions of said semiconductor device, and
   a standardized design rule information distributing means for distributing said standardized design rule information stored in said standardized design rule information storage means; and a designer terminal having a standardized design rule information receiving means for receiving said standardized design rule information distributed by said standardized design rule information distributing means, wherein said system further comprises an evaluation information storage means for storing measurement data extraction circuit design information indicating design conditions of a measurement data extraction circuit for extracting measurement data of actual operating characteristics from said semiconductor device and evaluation data calculation method information indicating a method of calculation of evaluation data containing tabulated extracted measurement data, said production process standardization apparatus further has an evaluation information distributing means for distributing said measurement data extraction circuit design information stored in said evaluation information storage means and said evaluation data calculation method information, and said system further comprises a manufacturer terminal having an evaluation information receiving means for receiving said measurement data extraction circuit design information and said evaluation data calculation method information distributed by said evaluation information distributing means and an evaluation data calculating means for calculating said evaluation data from said measurement data of said semiconductor device extracted by said measurement data extraction circuit indicated in said received measurement data extraction circuit design information following said evaluation data calculation method information received by said evaluation information receiving means and, wherein said measurement data extraction circuit extracts said measurement data containing of the characteristics of the semiconductor device converted to numerical values for each item of evaluation of characteristics and said measurement data extraction circuit converts the characteristics of said semiconductor device to numerical values by replacing the characteristics of said semiconductor device by counter values.

2. A production process standardization system as set forth in claim 1, wherein said measurement data extraction circuit comprises a circuit standardized in accordance with said standardized design rules, and said method of calculation of said evaluation data comprises a method of calculation tabulating said measurement data in a standardized format.

3. A production process standardization system as set forth in claim 1, wherein said system further comprises a standard value data storage means for commonly managing and storing standard value data of said evaluation data, said production process standardization apparatus further has a standard value data distributing means for distributing said standard value data stored in said standard value data storage means, said manufacturer terminal further has a standard value data receiving means for receiving said standard value data distributed by said standard value distributing means, and said evaluation data calculation method comprises a method of calculating a statistical average of said measurement data and using the calculated statistical average and said standard value data received by said standard value data receiving means to calculate a deviation value of said measurement data as said evaluation data.

4. A production process standardization system as set forth in claim 1, wherein said manufacturer terminal further has an evaluation data transmitting means for transmitting said evaluation data calculated by said evaluation data calculating means, said production process standardization apparatus further has an evaluation data receiving means for receiving said evaluation data transmitted by said evaluation data transmitting means, and said system further has an evaluation data storage means for storing said evaluation data received by said evaluation data receiving means.

5. A production process standardization system as set forth in claim 4, wherein said production process standardization apparatus further has an evaluation data distributing means for distributing said evaluation data stored in said evaluation data storage means, and said designer terminal further has an evaluation data receiving means for receiving said evaluation data distributed by said evaluation data distributing means.

6. A production process standardization system as set forth in claim 1, wherein said standardized design rule information has two-dimensional design rule information indicating a circuit layout of said semiconductor device and circuit characteristic parameter information indicating a model of characteristics of said circuit.

7. A production process standardization system as set forth in claim 1, wherein said system further has a design asset data storage means for storing as design asset data the design data of said semiconductor device designed in accordance with said standardized design rules, said production process standardization apparatus further has a design asset data distributing means for distributing said design asset data stored in said design asset data storage means, and said designer terminal further has a design asset data receiving means for receiving said design asset data distributed by said design asset data distributing means.

8. A production process standardization system as set forth in claim 7, wherein said designer terminal further has a design asset data inputting means for inputting said design asset data and design asset data transmitting means for transmitting said design asset data input by said design asset data inputting means, said production process standardization apparatus further has a design asset data tabulating means for receiving said design asset data transmitted by said design asset data transmitting means, and said design asset data storage means stores said design asset data received by said design asset data tabulating means.

9. A production process standardization method for standardizing the production process of a semiconductor device comprising the steps of:

commonly managing standardized design rules including standardized design conditions of said semiconductor device;

having a plurality of designers design said semiconductor device following said commonly managed standardized design rules;

commonly managing design conditions of a measurement data extraction circuit for extracting measurement data of actual operating characteristics from said semiconductor device and a method of calculation of evaluation data containing tabulated extracted measurement data; and having a plurality of manufacturers use said measurement data extraction circuit formed in accordance with said commonly managed design conditions of said measurement data extraction circuit to extract said measurement data of said semiconductor device and calculate said evaluation data from said extracted measurement data following the commonly managed method of calculation of said evaluation data.

10. A production process standardization method as set forth in claim 9, wherein said method further comprises a step of commonly managing standard value data of said evaluation data and said evaluation data calculation method comprises a method for calculating a statistical average of said measurement data and using the calculated statistical average and said standard value data of said commonly managed evaluation data to calculate a deviation value of said measurement data as said evaluation data.

11. A production process standardization method as set forth in claim 9, wherein said measurement data calculated by said plurality of manufacturers is commonly managed, and said commonly managed evaluation data can be referred to by said designer.

12. A production process standardization method as set forth in claim 9, wherein said measurement data extraction circuit extracts measurement data containing characteristics of said semiconductor device converted to numerical values for each item of evaluation of characteristics.

13. A production process standardization method as set forth in claim 12, wherein said measurement data extraction circuit converts the characteristics of said semiconductor device to numerical values by replacing the characteristics of said semiconductor device with counter values.

14. A production process standardization method as set forth in claim 9, wherein said standardized design rules have two-dimensional design rules indicating a circuit layout of said semiconductor device and circuit characteristic parameters indicating a model of characteristics of said circuit.

15. A production process standardization method as set forth in claim 9, further comprising the steps of:

storing as design asset data the design data of said semiconductor device designed in accordance with said standardized design rules; and said designer acquires said required design asset data from said stored design asset data and design said semiconductor device incorporating said acquired design asset data.

\* \* \* \* \*